US009760290B2

(12) United States Patent
Jayaraman et al.

(10) Patent No.: US 9,760,290 B2
(45) Date of Patent: Sep. 12, 2017

(54) SMART VOLUME MANAGER FOR STORAGE SPACE USAGE OPTIMIZATION

(71) Applicant: INTERNATIONAL BUSINESS MACHINES CORPORATION, Armonk, NY (US)

(72) Inventors: Arunachalam Jayaraman, Chennai (IN); Viren D. Parikh, Bangalore (IN); Ramesh C. Pathak, Bangalore (IN); Suryanarayana K. Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 14/864,998

(22) Filed: Sep. 25, 2015

(65) Prior Publication Data

US 2017/0090774 A1 Mar. 30, 2017

(51) Int. Cl.

| | |
|---|---|
| ***G06F 11/14*** | (2006.01) |
| ***G06F 12/00*** | (2006.01) |
| ***G06F 3/06*** | (2006.01) |
| ***G06F 17/30*** | (2006.01) |

(52) U.S. Cl.

CPC .......... *G06F 3/0608* (2013.01); *G06F 3/0619* (2013.01); *G06F 3/0665* (2013.01); *G06F 3/0689* (2013.01); *G06F 17/30138* (2013.01)

(58) Field of Classification Search

CPC ............... G06F 3/0604; G06F 11/1464; G06F 11/1466; G06F 11/1469

USPC .......................................................... 711/114

See application file for complete search history.

(56) References Cited

U.S. PATENT DOCUMENTS

| | | | | |
|---|---|---|---|---|
| 6,782,410 | B1 * | 8/2004 | Bhagat | G06F 9/5027 709/201 |
| 6,842,377 | B2 * | 1/2005 | Takano | G11C 7/1021 365/185.21 |
| 7,017,011 | B2 * | 3/2006 | Lesmanne | G06F 12/082 711/141 |
| 7,196,942 | B2 * | 3/2007 | Khurana | G11C 7/1051 326/38 |
| 7,321,955 | B2 * | 1/2008 | Ohmura | G06F 12/0804 711/113 |
| 7,512,736 | B1 * | 3/2009 | Overby | G06F 3/0607 707/999.202 |
| 7,877,554 | B2 * | 1/2011 | Bonwick | G06F 11/2094 707/697 |
| 8,230,193 | B2 * | 7/2012 | Klemm | G06F 3/0608 711/114 |
| 8,566,546 | B1 * | 10/2013 | Marshak | G06F 3/0604 711/112 |
| 8,930,663 | B2 | 1/2015 | Yochai et al. | |
| 8,990,527 | B1 * | 3/2015 | Linstead | G06F 3/0617 711/161 |

(Continued)

*Primary Examiner* — Mark Giardino, Jr.
*Assistant Examiner* — Mohamed Gebril
(74) *Attorney, Agent, or Firm* — Law Office of Jim Boice

(57) ABSTRACT

A computer-implemented method, system, and/or computer program product optimizes storage space usage. One or more processor, which implement a Smart Volume Manager, receive an input/output (I/O) client process that requests an I/O action from a file system storage device. In response to determining that the file system storage device is operating at 100% capacity, the Smart Volume Manager generates a dynamic virtual buffer disk group from multiple donor disk groups, and then redirects the I/O client process to the dynamic virtual buffer disk group, which is appended to the file system storage device to create an extended filesystem volume.

17 Claims, 6 Drawing Sheets

(56) References Cited

U.S. PATENT DOCUMENTS

2004/0068621 A1* 4/2004 Van Doren ......... G06F 12/0828 711/144
2005/0125607 A1* 6/2005 Chefalas ............. G06F 12/0862 711/113
2007/0008328 A1* 1/2007 MacWilliams ..... G06F 12/0646 345/530
2009/0094413 A1* 4/2009 Lehr ..................... G06F 3/0605 711/112
2009/0228648 A1* 9/2009 Wack .................. G06F 11/1092 711/114
2010/0046267 A1* 2/2010 Yan ........................ G11C 16/24 365/51
2010/0050016 A1* 2/2010 Franklin ............. G06F 11/0727 714/6.32
2010/0125712 A1* 5/2010 Murase ............... G06F 11/1458 711/162
2010/0332780 A1* 12/2010 Furuya .................. G06F 3/0689 711/162
2011/0202735 A1* 8/2011 Kono .................. G06F 11/1451 711/162
2011/0307745 A1* 12/2011 McCune ........... G06F 17/30221 714/54
2012/0198107 A1* 8/2012 McKean ................. G06F 13/18 710/40
2013/0007373 A1* 1/2013 Beckmann ............ G06F 12/126 711/136
2013/0067161 A1* 3/2013 Chandra ................. G06F 13/12 711/114
2013/0111129 A1* 5/2013 Maki ..................... G06F 3/0611 711/117
2013/0152097 A1* 6/2013 Boctor .................... G06F 9/505 718/103
2013/0326270 A1* 12/2013 Chen ................... G06F 11/2089 714/6.21
2014/0003114 A1* 1/2014 Pellizzer ............. H01L 27/2481 365/63
2015/0089134 A1* 3/2015 Mukherjee .............. G06F 15/78 711/114
2016/0253109 A1* 9/2016 Litke ..................... G06F 3/0619

* cited by examiner

SMART VOLUME MANAGER FOR STORAGE SPACE USAGE OPTIMIZATION

BACKGROUND

The present disclosure relates to the field of storage devices, and specifically to systems that manage storage devices. More specifically, the present disclosure relates to optimizing storage space usage in storage devices.

SUMMARY

A computer-implemented method, system, and/or computer program product optimizes storage space usage. One or more processor, which implement a Smart Volume Manager, receive an input/output (I/O) client process that requests an I/O action from a file system storage device. In response to determining that the file system storage device is operating at 100% capacity, the Smart Volume Manager generates a dynamic virtual buffer disk group from multiple donor disk groups, and then redirects the I/O client process to the dynamic virtual buffer disk group, which is appended to the file system storage device to create an extended filesystem volume.

DETAILED DESCRIPTION

Figure 1:
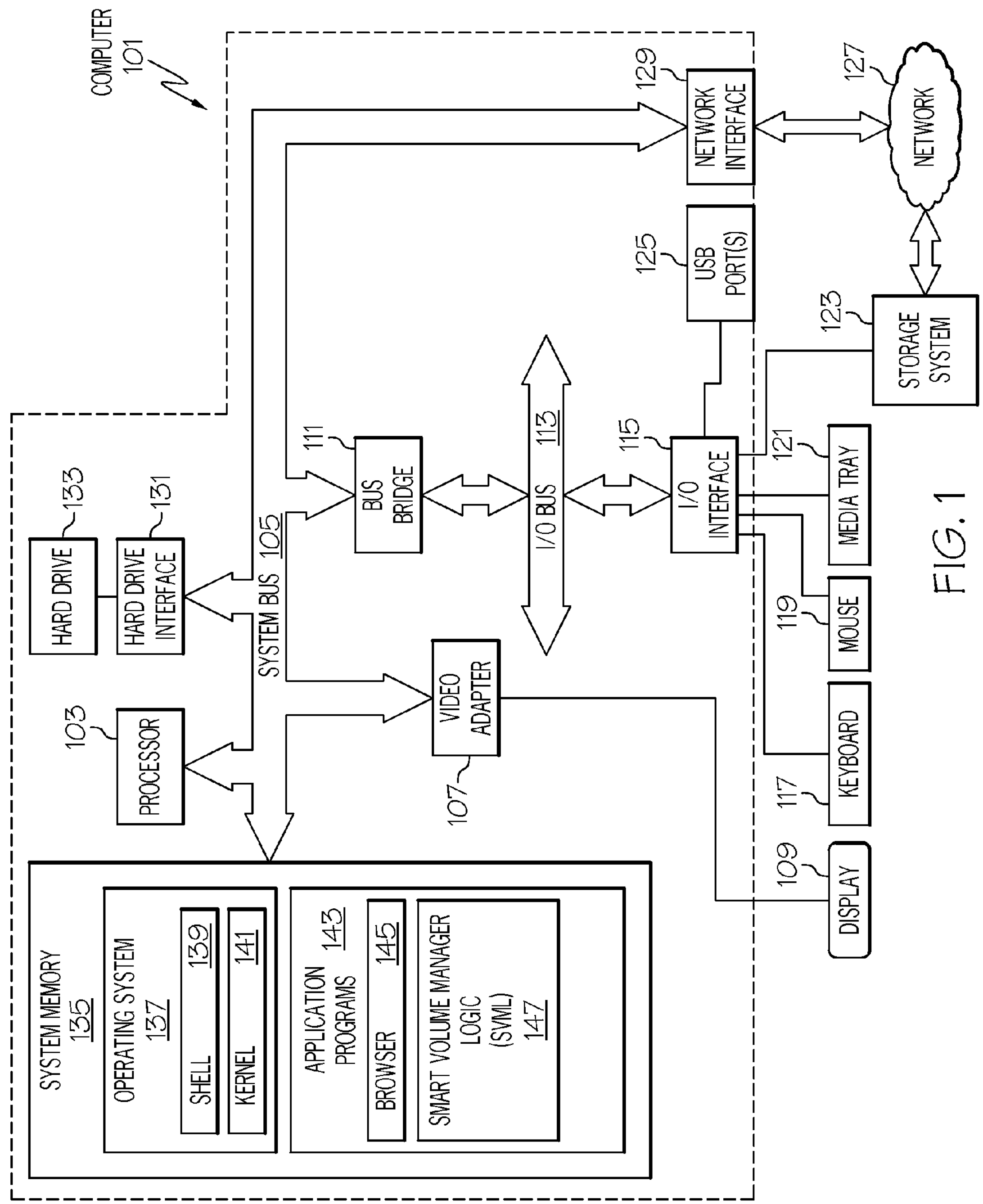
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by storage system 123 shown in FIG. 1.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with storage system 123 via the I/O interface 115, or by using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with storage system 123 and/or other systems.

Application programs 143 in computer 101's system memory also include Smart Volume Manager Logic (SVML) 147. SVML 147 includes code for implementing the processes described below, including those described in FIGS. 2-6.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

A "volume" is a single accessible storage area within a file system, such as a partition of a hard disk.

As described herein, in one or more embodiments the present invention installs a Smart Volume Manager (SVM) over a traditional disk volume manager for dynamically detecting file system incidents (e.g., input/output (I/O) write capacity to disk groups) and redirecting the file system I/O to a Dynamically created Virtual Buffer-Disk Group (DVB-DG).

The SVM identified multiple Disk Groups (DGs) within the file system that have excess disk space, which can be donated from the DGs to the DVB-DG, thereby redirecting the file system I/O to the DVB-DG.

The SVM continuously monitors file system usage and accommodates back the written data blocks from the DVB-DG to the original file system if the file system usage falls below a pre-determined threshold (e.g., 100%).

The SVM manages the process dynamically with the help of local/global bit maps, donor DGs, and/or dynamic virtual buffer DGs that are transparent to the operating system.

The SVM is thus able to dynamically detect file system incidents and to dynamically create the DVB-DG in order to redirect I/O write instructions.

As described herein, the inventive "Smart Volume Manager" goes beyond a traditional volume manager. The Smart Volume Manager dynamically detects "filesystem full" incidents that are the result of an input/output (I/O) event, and redirects the I/O to a temporarily created buffer space. This permits the swapping of data back when the filesystem returns to a state that below it's full threshold. In accordance with one or more embodiments of the present invention, the Smart Volume Manager utilizes bit maps, donor Disk Groups (DGs), and a Dynamically created Virtual Buffer-Disk Group (DVB-DG), which are transparent to the operating system, any traditional volume manager, and the application running over the traditional volume manager.

In one embodiment, the Smart Volume Manager includes an analytics engine, which is used to predict I/O and storage trends in order to make storage decisions on the fly.

A disk management subsystem is an most important component in any Information Technology (IT) system. Disk management subsystems are utilized to optimize utilization, capacity, and performance of storage devices. Unfortunately often the disk management subsystem is poorly managed and costs an excessive amount of capital as well as operational investments. The present invention provides a novel Smart Volume Manager that optimizes disk space within a given system boundary (e.g., a standalone storage device) and beyond (e.g., cloud storage). The Smart Volume Manager reallocates disk space from wherever it is freely available to whatever system needs it. That is, the Smart Volume Manager cuts the traditional limitation of "Filesystem, Volume, Disk groups" in a given system and beyond, thus cutting across diskgroup boundaries in a new and novel manner.

The Smart Volume Manager affords effective and optimal utilization of disk space within the given system boundary and beyond, leading to a reduction in capital investment of new disks procurement, a reduction of frequent filesystem full incidents, a reduction of operational costs, and better analytics to predict the disk space usage trends and predictive mechanism. The Smart Volume Manager enables I/O redirection on the fly and transparency to application subsystems. The Smart Volume manager enables the creation and/or use of dynamically changeable parameters and a more agile infrastructure for reacting swiftly to a storage demand, thus making the storage system more suitable for cloud and similar environments (e.g., SDDC—Software-Defined Data Center).

In one embodiment, the Smart Volume Manager described herein works in conjunction with the existing volume manager and filesystem in any operating environment. In this embodiment, the Smart Volume Manager is implemented (installed) over the existing volume manager so that the Smart Volume Manager can fully leverage the functionality of the existing volume manager.

The Smart Volume Manager identifies the unused free space across disk/volume groups in the system, and dynamically uses that unused free space whenever and wherever space is required across any of the filesystem or volumes with in the system boundary.

Figure 2:
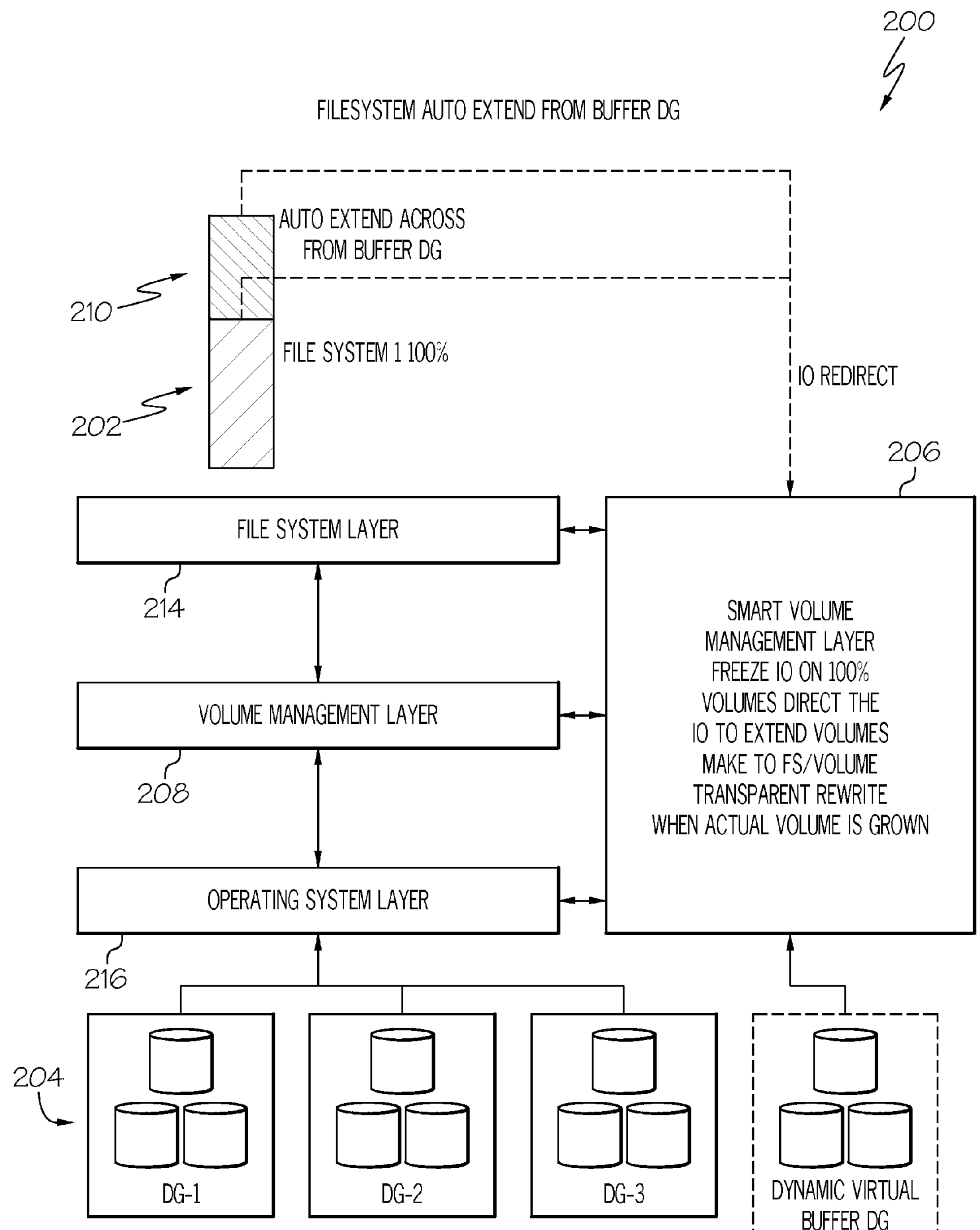
FIG. 2 illustrates an overview of working principles of a novel Smart Volume Manager in accordance with one or more embodiments of the present invention.

With reference now to FIG. 2, a diagram 200 depicts an overview of working principles of the Smart Volume Manager.

Filesystem 202, shown as "Filesystem 1", is depicted as being utilized 100%, and thus has no space to handle further data writes. In a traditional setup, the only option then would be to add additional disks in the underlying diskgroup 204 (depicted as "DG-1"), and expand the volume associated with the filesystem and extend the filesystem itself (i.e., extends the filesystem layer 214). This is a tedious and lengthy process that is unsuitable for handling ever changing dynamic workloads such as databases.

This problem is overcome by the Smart Volume Manager within the Smart Volume Management Layer 206, which abstracts the volume management layer 208 in order to cause the filesystem/volume (as defined in the filesystem layer 214) in File System 1 to grow (i.e., by the amount 210 depicted in FIG. 2) automatically across the disk/volume group boundary within the given system through the use of the auto-extend from the dynamic virtual buffer Disk Group 212. This same process can be implemented across the system boundary (e.g., across DG-2 and DG-3), such as when a common hypervisor layer is implemented in a cloud platform and/or Software Defined Data Centers (SDDCs) (not shown) or even under a same operating system layer 216.

The Smart Volume Management Layer 206 identifies the Donor DGs (from DG-1, DG-2, DG-3) and creates the Dynamic Virtual Buffer DG 212 in a given system on the fly based on the need of the system.

A Donor Disk Group (Donor DG) is a disk group that has excess unused disk space that is not in actual usage in the system. This excess/unused disk space is "Free space" that can be donated to the Dynamic Virtual Buffer-DG (DVB-DG) 212. The percentage of the disk space that can be donated to a DVB-DG 212 is configurable and controllable on the fly by a parameter called "donation percentage", which identifies the percentage of space available for donation by DG-1, DG-2 and/or DG-3 shown in FIG. 2.

Dynamic Virtual Buffer-Disk Group (DVB-DG) 212 is a virtual entity controlled by local and global bitmaps and managed by the Smart Volume Manager (i.e., the Smart Volume Management Layer 206). The DVB-DG 212 is virtually created using the "free disk space" donated by the Donor DGs (i.e., one or more of DG-1, DG-2, and/or DG-3). The magnitude of the DVB-DG 212 can be increased and/or decreased on the fly by adjusting the donation percentage parameter, thus making the DVB-DG 212 truly dynamic. However, the dynamic adjustment is subject to the actual usage of the disk space in both the donor disk group(s) and the DVB-DG 212. Thus, the DVB-DG 212 is an virtual entity created on a need basis by the Smart Volume Manager that is in the Smart Volume Management Layer 206.

When a "client process" tries to write on a 100% full filesystem and/or volumes in real time, the Smart Volume Manager interrupts the I/O (e.g., read/write request) on the filesystem and redirects the I/O to the newly created buffer space in the DVB-DG 212. When the filesystem falls below 100% usage and if the "written data blocks" can be accommodated back to the original filesystem, then the Smart Volume Manager (i.e., within the Smart Volume Management Layer 206) writes back all the data blocks which are temporarily stored in buffer space and re-establishes the I/O back to the original filesystem/volume. The entire process is internal to the Smart Volume Manager, such that the "Client Process" (e.g., the I/O events to the filesystem 202 shown in FIG. 2) is unaware of the background processes done by the Smart Volume Manager. That is, a "Client Process" is a client device (e.g., a computer) requesting an I/O event at the filesystem 202. From the "Client Process" view, the filesystem 202 is considered to be and is used as a "contiguous disk space", even if it does not actually have available space (i.e., with or without 100% filesystem usage).

Figure 3:
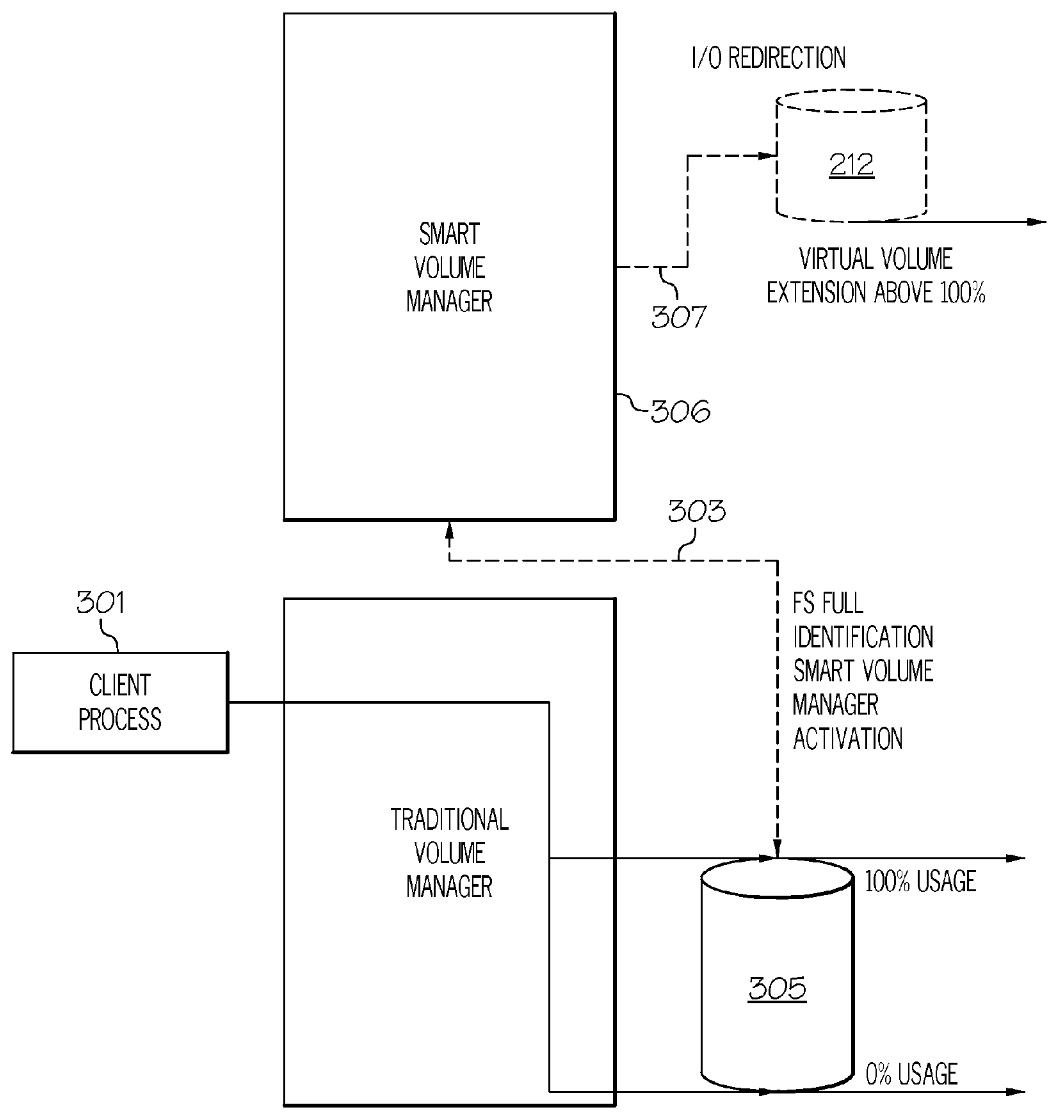
FIG. 3 depicts an exemplary client process being handled by the Smart Volume Manager.

Thus, with reference now to FIG. 3, consider client process 301, which may be a client device requesting that data be stored on a filesystem (i.e., a storage device). As shown by the first dotted line 303, the Smart Volume Manager 306 detects that Disk Group 305 is 100% full. The Smart Volume Manager 306 then redirects the client process 301 to the newly-created buffer space the existing creates the redirects the client process 301 to the DVB-DG 212, as indicated by the second dotted line 307. Thus, the first dotted line 303 represents the detection by the Smart Volume Manager 306 of the 100% disk space usage in the filesystem represented by Disk Group (DG) 305, and the second dotted line 307 represents the activation and I/O redirection of the client process 301 to the DVB-DG 212 on the fly.

Figure 4:
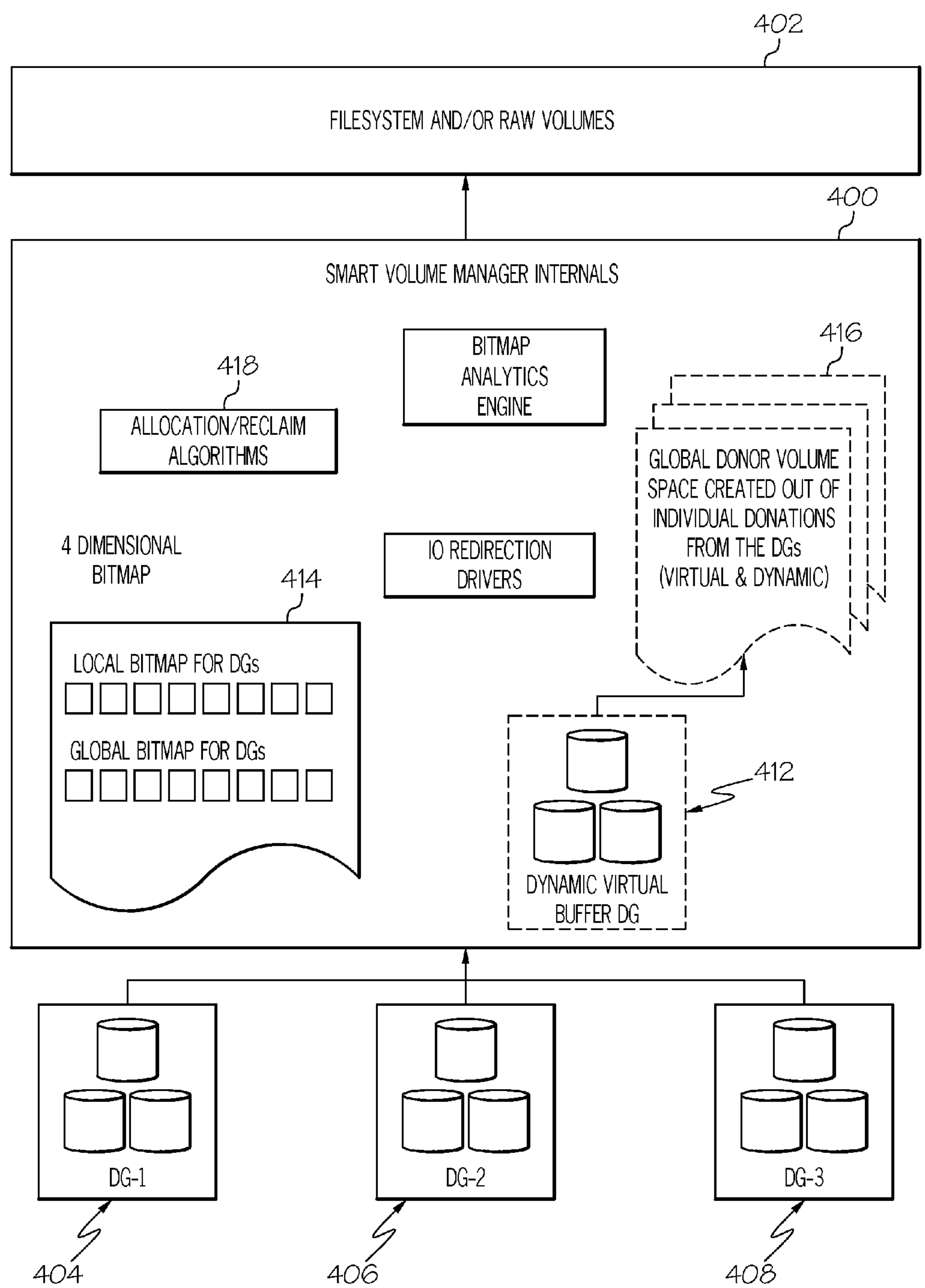
FIG. 4 illustrates the Smart Volume Manager Internals in accordance with one or more embodiments of the present invention.

With reference now to FIG. 4, a diagram describing the Smart Volume Manager Internals 400 is presented.

Donor Disk Groups (Donor DGs): The Donor DGs are depicted as Donor DG 404 (DG-1), Donor DG 406 (DG-2), and Donor DG 408 (DG-3), and are analogous to the Donor Disk Groups DG-1, DG-2, and DG-3 depicted in FIG. 2. In one embodiment, Donor Disk Groups DG-1, DG-2, and DG-3 depicted in FIG. 4 are managed by a traditional volume manager.

Dynamically created Virtual Buffer-Disk Group (DVB-DG): As described above, the DVB-DG is created out of a donation percentage from one or more of the Donor Disk Groups DG-1, DG-2, and DG-3.

Four Dimensional Local Bit Map of DGs: The four dimensional bit map 414 uses a contiguous and small amount of disk space (i.e., similar to an index) that maps out locations in every DG (e.g., DG-1, DG-2, DG-3), thereby identifying the used diskspace in the DGs. The four dimensional bit map 414 is also used when the Smart Volume Manager dynamically evaluates the "Free disk space" in a given DG. Along with the donation percentage set with each DG, the local bit map in the four dimensional bit map 414 for the DGs is used by the Smart Volume Manager to decide how much (i.e., what percentage) of disk space can be donated from a donor diskgroup (DG).

Every diskgroup in a given system will have at least one local bit map. The local bit map for the DGs can be viewed against 4 different dimensions (i.e., time, disk group, filesys/volume, and allocation and de-allocation magnitude—see FIG. 5 below).

Four Dimensional Global Bit Map: the global bit map for the DGs found in the four dimensional bitmap 414 is also an index within the Smart Volume Manager, and keeps track (i.e., maps) donated space from each diskgroup (e.g., DG-1, DG-2, DG-3). Both of the local/global bit maps in the four dimensional bitmap 414 are dynamic and virtual, and are analogous to "memory addressing".

Global Volume/Disk Space (GV/DS): The GV/DS 416 is a physically non-contiguous, but virtually contiguous disk/volume space created out of donated disk/volume space by the donor DGs. When the filesystem and/or volume reach 100% full, the Smart Volume Manager redirects the I/O to the GV/DS space, thus making the write operation by the client process unaware of the Smart Volume Manager's internal I/O redirection, thereby making the application transparent.

The Concept of four dimensional bit map and usage analytics

The bitmap is viewed against 4 different dimensions in order to allow the Smart Volume Manager to make smart decisions for data block allocation and reclaim. These four dimensions and their axes are:

x-axis-->Time y-axis-->Data block allocation & de-allocation magnitude from the Global Volume/Disk Space GV/DS and Local DGs z-axis-->Diskgroup donation/reclaim magnitude a-axis-->Filesystem allocation/de-allocation magnitude.

Various predictive decisions are made by the Smart Volume Manager using the 4 dimensional bit map, such as:

x-y Axis-->By keeping a close look and monitoring the bit map magnitude against the time dimension, the Smart Volume Manager is able to dynamically predict the peak disk capacity, average disk space capacity, and the disk capacity trend for a given period of time. This predictive mechanism allows the Smart Volume Manager to feed and activated the allocation/reclaim algorithms 418 with in the given system boundary.

y-z Axis-->Analyzing the bit map against z axis "diskgroup" allows the Smart Volume Manager to predict which diskgroup is heavily utilized and which diskgroup will "always donate" (being idle). This allows the Smart Volume Manager to decide on how disk group reorganization should proceed.

y-a Axis-->Analyzing the bit map against a axis "filesystem" allows the Smart Volume Manager to predict which filesystem recently went to 100% capacity and which one is never utilized. It allows the Smart Volume Manager to decide how to reorganize the filesystem.

Figure 5:
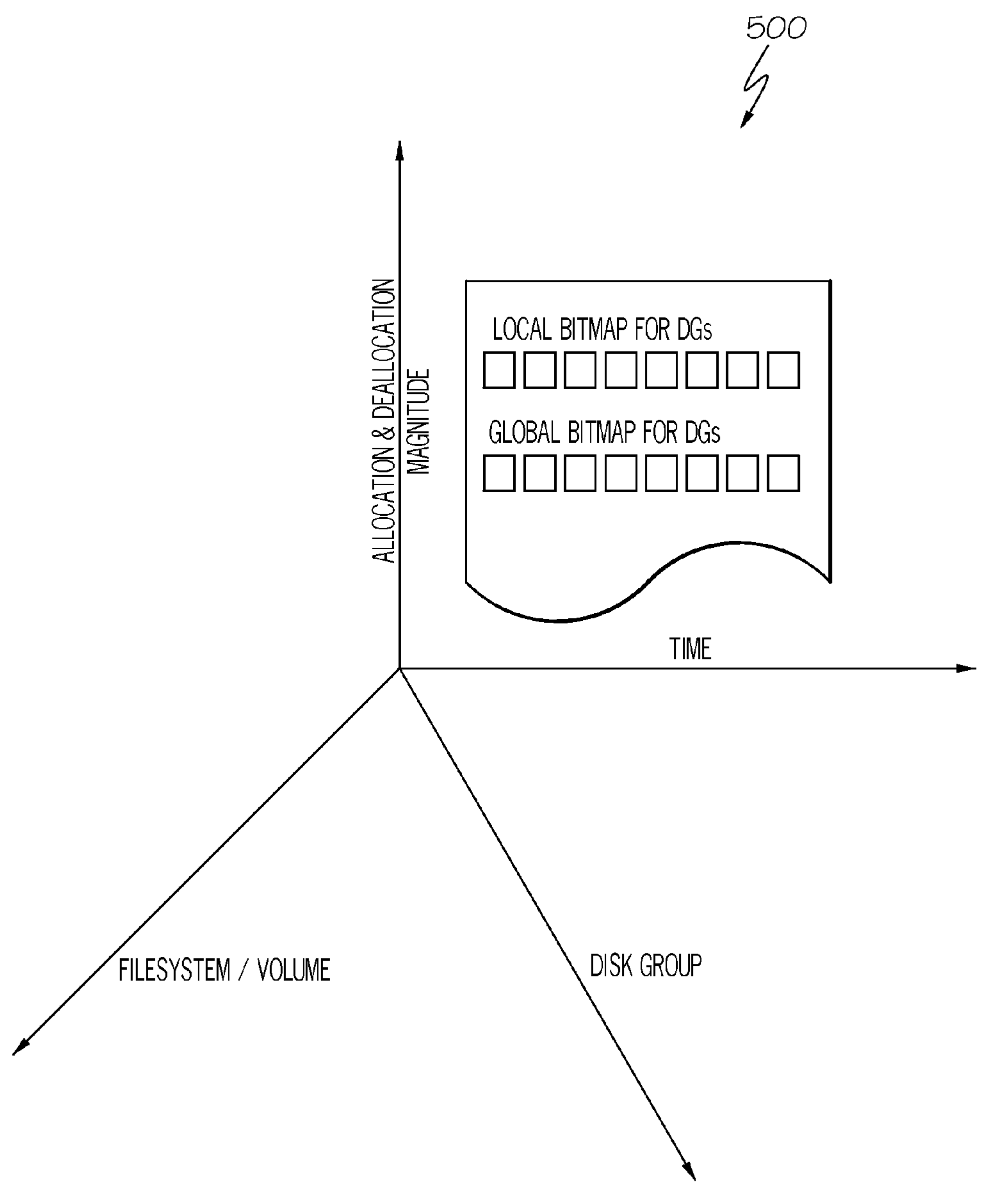
FIG. 5 depicts a 4-dimensional graph for local and global bitmaps for disk groups in accordance with one or more embodiments of the present invention.

In the 4-dimensional graph 500 depicted in FIG. 5, there are 2 bit maps (local bitmap for DGs and global bit map for DGs), each having 4 dimensions. Thus, there are 2×4×4=32 different business views that are generated out the 4 dimensional bit maps.

The number of dimensions are not restricted, and are not limited to those depicted in FIG. 5. Other dimensions that can be used include:

I/O throughput per "Data block of GV/DS". This allows the Smart Volume Manager to manage how data is sent to and retrieved from the GV/DS.

Response time per "Data block of GV/DS". This allows the Smart Volume Manager to select a particular GV/DS based on needed responsiveness.

Figure 6:
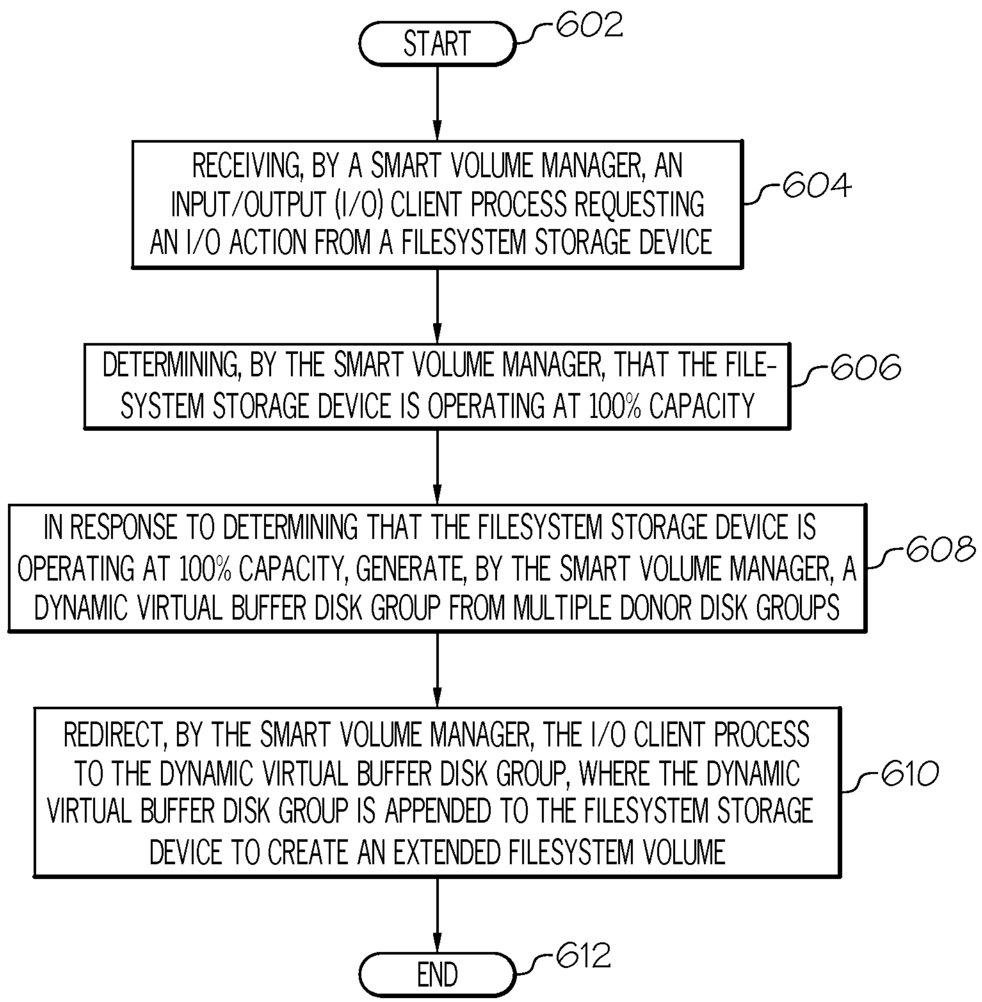
FIG. 6 is a high level flow chart of one or more steps performed by one or more processors and/or other hardware devices to optimize storage space usage in accordance with one or more embodiments of the present invention.

With reference now to FIG. 6, a high level flow chart of one or more steps performed by one or more processors and/or other hardware devices to optimize storage space usage in accordance with one or more embodiments of the present invention is presented.

After initiator block 602, one or more processors (implementing a Smart Volume Manager) receive an input/output (I/O) client process, as described in block 604. The I/O client process requests an I/O action from a file system storage device, as depicted in FIG. 3.

As described in block 606, the Smart Volume Manager determines that the file system storage device is operating at 100% capacity.

As described in block 608, the Smart Volume Manager, in response to determining that the file system storage device is operating at 100% capacity, generates a dynamic virtual buffer disk group from multiple donor disk groups (see FIG. 2).

As described in block 610, the Smart Volume Manager redirects the I/O client process to the dynamic virtual buffer disk group. As shown in FIG. 2, the dynamic virtual buffer disk group is appended to the file system storage device to create an extended filesystem volume.

The flow chart ends at terminator block 612.

In one embodiment of the present invention presented herein, the I/O client process is a write operation.

In one embodiment of the present invention presented herein, the Smart Volume Manager maps a local bitmap for the donor disk groups and a global bitmap for the donor disk groups. The local bitmap for the donor disk groups identifies a percentage of storage space that is available for donation by each of the donor disk groups, and the global bitmap for the donor disk groups identifies how much storage space has been donated by each of the donor disk groups to create the dynamic virtual buffer disk group.

In one embodiment of the present invention presented herein, the Smart Volume Manager maps the local bitmap and the global bitmap to a time axis and a data block allocation and de-allocation magnitude axis, in order to dynamically predict a peak disk capacity, an average disk space capacity, and a disk capacity trend for a give period of time for a combination of the donor disk groups.

In one embodiment of the present invention presented herein, the Smart Volume Manager maps the local bitmap and the global bitmap to a data block allocation and de-allocation magnitude axis and a disk group donation/reclaim axis, in order to dynamically predict which of the donor disk groups are being utilized at capacity and which of the donor disk groups are always able to donate disk space to the dynamic virtual buffer disk group.

In one embodiment of the present invention presented herein, the Smart Volume Manager maps the local bitmap and the global bitmap to a data block allocation and de-allocation magnitude axis and filesystem allocation/de-allocation magnitude axis, in order to dynamically predict which of the donor disk groups have gone to 100% utilization within a predetermined period of time and which of the donor disk groups have never been used to donate disk space to the dynamic virtual buffer disk group.

In one embodiment of the present invention presented herein, all of the multiple donor disk groups are managed by a same operating system (see FIG. 2).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method of optimizing storage space usage, the computer-implemented method comprising:

receiving, by one or more processors implementing a Smart Volume Manager, an input/output (I/O) client process, wherein the I/O client process requests an I/O action from a file system storage device;

determining, by said one or more processors implementing the Smart Volume Manager, that the file system storage device is operating at 100% capacity;

in response to determining that the file system storage device is operating at 100% capacity, generating, by said one or more processors implementing the Smart Volume Manager, a dynamic virtual buffer disk group from multiple donor disk groups;

redirecting, by said one or more processors implementing the Smart Volume Manager, the I/O client process to the dynamic virtual buffer disk group, wherein the dynamic virtual buffer disk group is appended to the file system storage device to create an extended filesystem volume; and mapping, by said one or more processors implementing the Smart Volume Manager, a local bitmap and a global bitmap to a time axis and a data block allocation and de-allocation magnitude axis to dynamically predict a peak disk capacity, an average disk space capacity, and a disk capacity trend for a given period of time for a combination of the donor disk groups.

2. The computer-implemented method of claim 1, wherein the I/O client process is a write operation.

3. The computer-implemented method of claim 1, further comprising:

mapping, by said one or more processors implementing the Smart Volume Manager, the local bitmap for the donor disk groups and the global bitmap for the donor disk groups, wherein the local bitmap for the donor disk groups identifies a percentage of storage space that is available for donation by each of the donor disk groups, and wherein the global bitmap for the donor disk groups identifies how much storage space has been donated by each of the donor disk groups to create the dynamic virtual buffer disk group.

4. The computer-implemented method of claim 3, further comprising:

mapping, by said one or more processors implementing the Smart Volume Manager, the local bitmap and the global bitmap to a data block allocation and de-allocation magnitude axis and a disk group donation/reclaim axis to dynamically predict which of the donor disk groups are being utilized at the 100% capacity and which of the donor disk groups are always able to donate disk space to the dynamic virtual buffer disk group.

5. The computer-implemented method of claim 3, further comprising:

mapping, by said one or more processors implementing the Smart Volume Manager, the local bitmap and the global bitmap to a data block allocation and de-allocation magnitude axis and filesystem allocation/de-allocation magnitude axis to dynamically predict which of the donor disk groups have gone to 100% utilization within a predetermined period of time and which of the donor disk groups have never been used to donate disk space to the dynamic virtual buffer disk group.

6. The computer-implemented method of claim 1, wherein all of the multiple donor disk groups are managed by a same operating system.

7. A computer program product for optimizing storage space usage, the computer program product comprising a non-transitory computer readable storage medium having program code embodied therewith, wherein the program code is readable and executable by a processor to perform a method comprising:

receiving, by a Smart Volume Manager, an input/output (I/O) client process, wherein the I/O client process requests an I/O action from a file system storage device;

determining, by the Smart Volume Manager, that the file system storage device is operating at 100% capacity;

in response to determining that the file system storage device is operating at 100% capacity, generating, by the Smart Volume Manager, a dynamic virtual buffer disk group from multiple donor disk groups;

redirecting the I/O client process to the dynamic virtual buffer disk group, wherein the dynamic virtual buffer disk group is appended to the file system storage device to create an extended filesystem volume; and mapping a local bitmap and a global bitmap to a data block allocation and de-allocation magnitude axis and a disk group donation/reclaim axis to dynamically predict which of the donor disk groups are being utilized at the 100% capacity and which of the donor disk groups are always able to donate disk space to the dynamic virtual buffer disk group.

8. The computer program product of claim 7, wherein the I/O client process is a write operation.

9. The computer program product of claim 7, wherein the method further comprises:

mapping the local bitmap for the donor disk groups and the global bitmap for the donor disk groups, wherein the local bitmap for the donor disk groups identifies a percentage of storage space that is available for donation by each of the donor disk groups, and wherein the global bitmap for the donor disk groups identifies how much storage space has been donated by each of the donor disk groups to create the dynamic virtual buffer disk group.

10. The computer program product of claim 9, wherein the method further comprises:

mapping the local bitmap and the global bitmap to a time axis and a data block allocation and de-allocation magnitude axis to dynamically predict a peak disk capacity, an average disk space capacity, and a disk capacity trend for a given period of time for a combination of the donor disk groups.

11. The computer program product of claim 9, wherein the method further comprises:

mapping the local bitmap and the global bitmap to a data block allocation and de-allocation magnitude axis and filesystem allocation/de-allocation magnitude axis to dynamically predict which of the donor disk groups have gone to 100% utilization within a predetermined period of time and which of the donor disk groups have never been used to donate disk space to the dynamic virtual buffer disk group.

12. The computer program product of claim 7, wherein all of the multiple donor disk groups are managed by a same operating system.

13. A computer system comprising:

a processor, a computer readable memory, and a non-transitory computer readable storage medium;

first program instructions to receive, by a Smart Volume Manager, an input/output (I/O) client process, wherein the I/O client process requests an I/O action from a file system storage device;

second program instructions to determine, by the Smart Volume Manager, that the file system storage device is operating at 100% capacity;

third program instructions to, in response to determining that the file system storage device is operating at 100% capacity, generate, by the Smart Volume Manager, a dynamic virtual buffer disk group from multiple donor disk groups;

fourth program instructions to redirect the I/O client process to the dynamic virtual buffer disk group, wherein the dynamic virtual buffer disk group is appended to the file system storage device to create an extended filesystem volume; and fifth program instructions to map a local bitmap and a global bitmap to a data block allocation and de-allocation magnitude axis and filesystem allocation/de-allocation magnitude axis to dynamically predict which of the donor disk groups have gone to 100% utilization within a predetermined period of time and which of the donor disk groups have never been used to donate disk space to the dynamic virtual buffer disk group; and wherein the first, second, third, fourth, and fifth program instructions are stored on the non-transitory computer readable storage medium for execution by one or more processors via the computer readable memory.

14. The computer system of claim 13, wherein the I/O client process is a write operation.

15. The computer system of claim 13, further comprising:

sixth program instructions to map the local bitmap for the donor disk groups and the global bitmap for the donor disk groups, wherein the local bitmap for the donor disk groups identifies a percentage of storage space that is available for donation by each of the donor disk groups, and wherein the global bitmap for the donor disk groups identifies how much storage space has been donated by each of the donor disk groups to create the dynamic virtual buffer disk group; and wherein the sixth program instructions are stored on the non-transitory computer readable storage medium for execution by said one or more processors via the computer readable memory.

16. The computer system of claim 15, further comprising:

seventh program instructions to map the local bitmap and the global bitmap to a time axis and a data block allocation and de-allocation magnitude axis to dynamically predict a peak disk capacity, an average disk space capacity, and a disk capacity trend for a give period of time for a combination of the donor disk groups; and wherein the seventh program instructions are stored on the non-transitory computer readable storage medium for execution by said one or more processors via the computer readable memory.

17. The computer system of claim 15, further comprising:

seventh program instructions to map the local bitmap and the global bitmap to a data block allocation and de-allocation magnitude axis and a disk group donation/reclaim axis to dynamically predict which of the donor disk groups are being utilized at the 100% capacity and which of the donor disk groups are always able to donate disk space to the dynamic virtual buffer disk group; and wherein the seventh program instructions are stored on the non-transitory computer readable storage medium for execution by said one or more processors via the computer readable memory.

* * * * *